Aug. 16, 1932.   H. B. GREENING ET AL   1,872,636
VARIABLE SPEED TRANSMISSION
Filed Jan. 17, 1931   2 Sheets-Sheet 1
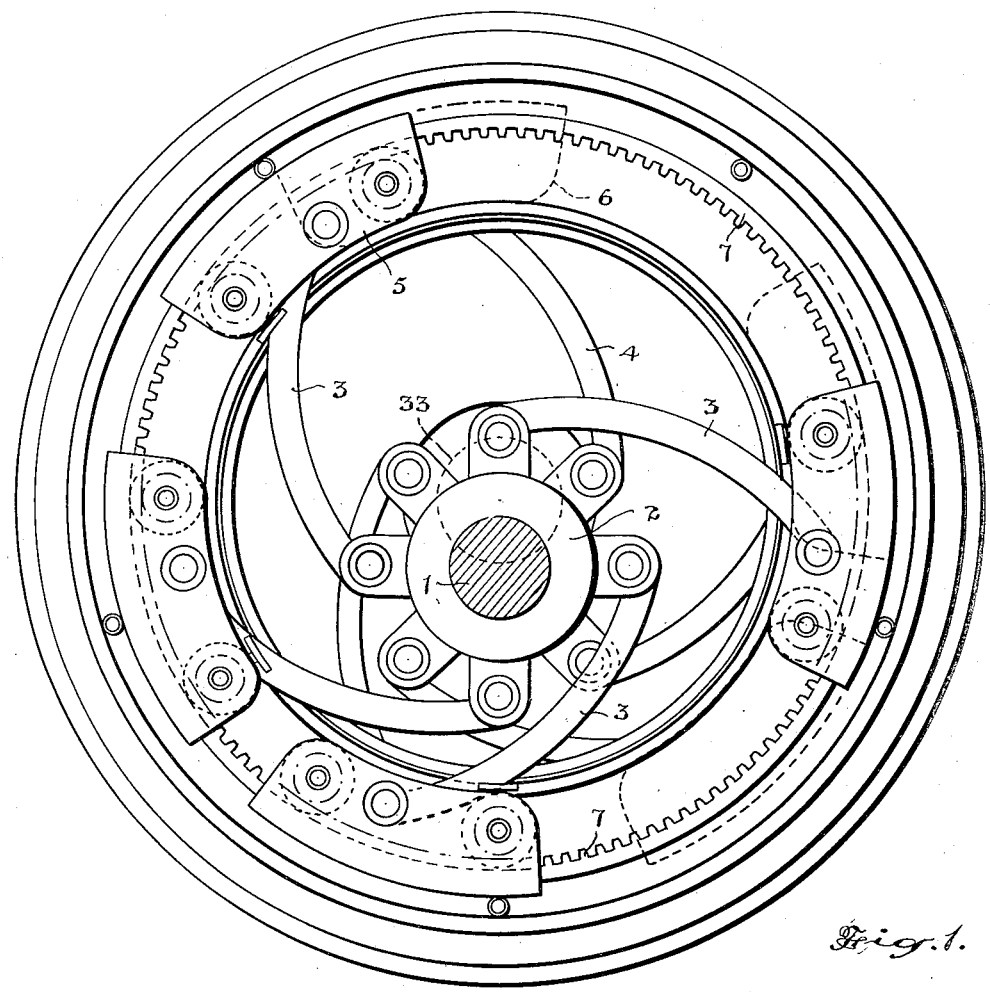
Fig. 1.
Fig. 3.
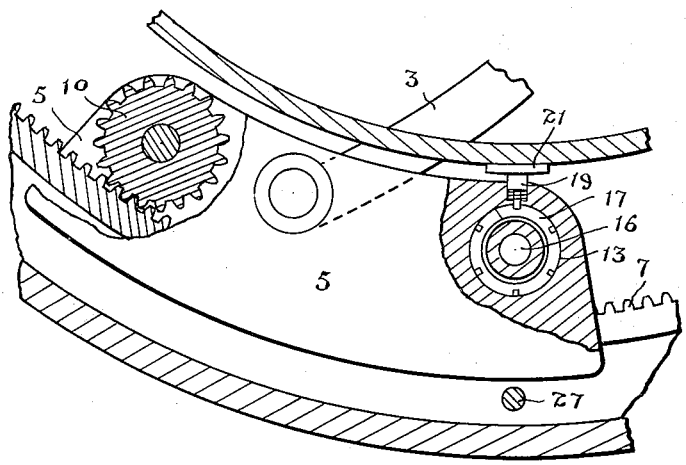
Inventors.
Herald B. Greening.
James W. Galloway.
by
A. J. S. Dennison
atty.

Patented Aug. 16, 1932

1,872,636

UNITED STATES PATENT OFFICE

HERALD B. GREENING AND JAMES W. GALLOWAY, OF HAMILTON, ONTARIO, CANADA, ASSIGNORS TO GALLOWAY ENGINEERING COMPANY LIMITED, OF HAMILTON, ONTARIO, CANADA

VARIABLE SPEED TRANSMISSION

Application filed January 17, 1931. Serial No. 509,325.

The principal objects of this invention are to enhance the operative features of a variable speed transmission device of the type wherein a plurality of clutch mechanisms carried by arms mounted upon a crank member are adapted to engage a fixed member and the driven member to effect the transmission of power in variable ratios.

A further and important object is to enable a device of this class to be operated in forward and reverse directions, and a still further and important object is to enable such a mechanism to be driven in a 1 to 1 ratio, that is to say, in a direct drive.

The principal features of the invention consist in the novel arrangement of toothed gears on the stationary and driven members co-operating with toothed gears carried by the arms mounted on the driving member and in the adaptation of over-running clutches in the gears carried by said arms, whereby the free wheeling of said gears is permitted in one direction and whereby a constant operating connection is maintained with the driven member.

In the accompanying drawings, Figure 1 is a transverse sectional view through the variable clutching mechanism taken through the line 1—1 of Figure 2.

Figure 3 is an enlarged elevational detail in part section of one of the clutch shoes.

Figure 2:
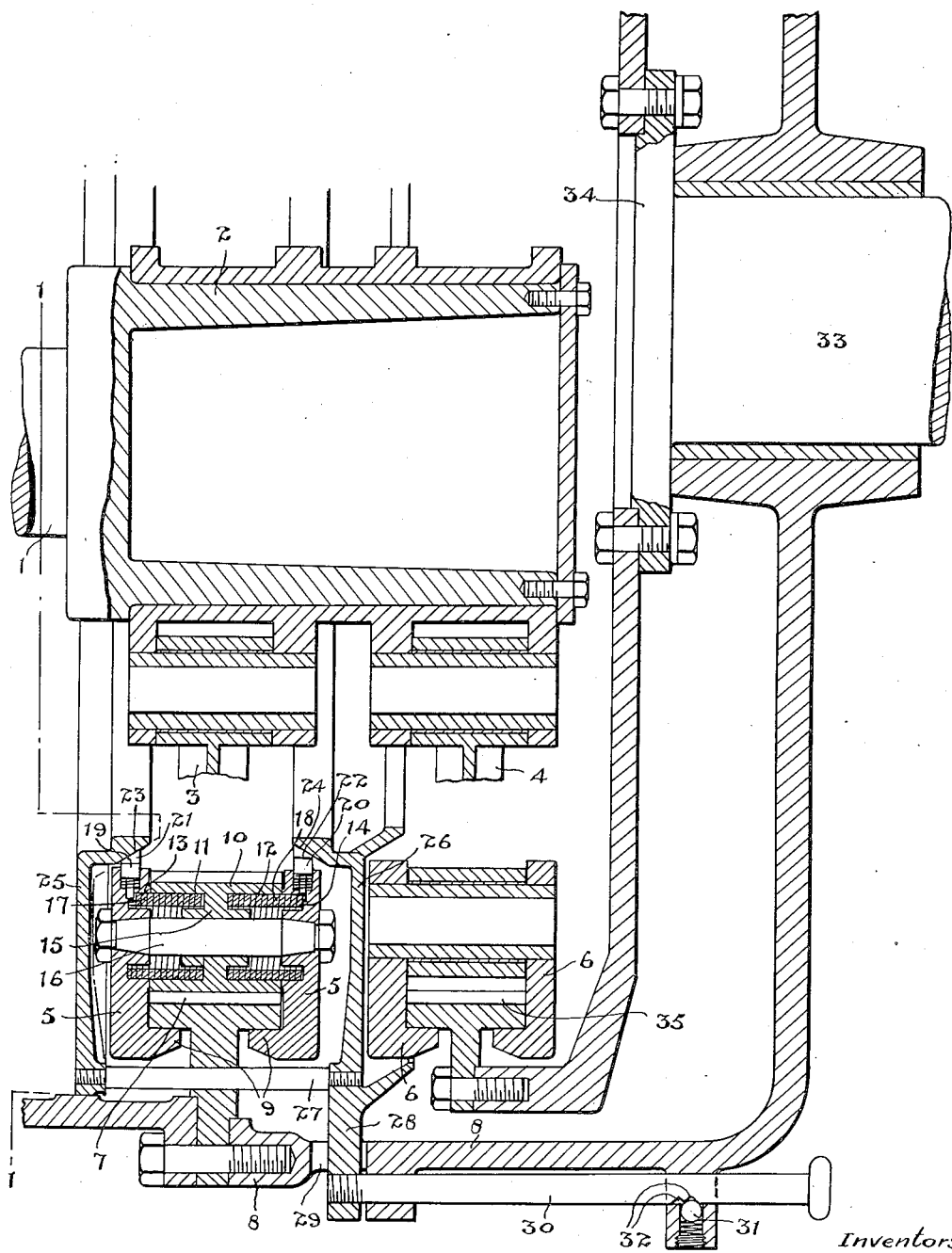
Figure 2 is an enlarged longitudinal sectional view through a portion of the variable clutching structure.

In the structure as illustrated in Figure 1 the crank pin 1 of the driving shaft has mounted thereon the flanged sleeve 2 upon which are pivotally mounted the sets of arms 3 and 4, at the outer ends of which are pivotally secured the shoes 5 and 6.

An integral gear ring 7 is rigidly secured to the casing 8 and the shoes 5 of the arms 3 are formed with inwardly turned flanges 9 to slidably engage the flanged rim of said gear ring.

Mounted between the side walls of each of the shoes 5 are gear pinions 10 which mesh with the gear teeth of the internal gear ring and each of said gear pinions is formed with cylindrical recesses 11 and 12 at either end which register with recesses 13 and 14 respectively in the side members of the shoe and are of the same internal diameter. The pinions are journalled upon central structures 15 mounted on the pins 16 secured in the side members of the shoe.

Within the recesses 11, 12, 13 and 14 are arranged respectively the helical spring clutch members 17 and 18. These springs are a friction fit in the recesses 11 and 12 in the pinions and the ends extending into the recesses 13 and 14 in the shoe members are a free running fit.

Plungers 19 and 20 are arranged in the opposite members of the shoe to extend into the spring recesses 13 and 14 respectively to engage the inner ends of the springs to cause the springs to expand and to grip the walls of the recesses in the shoe members.

Each of these plungers is provided with an angle shoe 21 or 22 at the outer end to engage respectively the bevelled surface 23 or 24 of either of the movable rings 25 or 26.

These rings are arranged within the casing and are rigidly connected by the cross studs 27, the ring 26 being provided with a lug extension 28 extending through a slot 29 in the casing 8 to which is secured a rod 30 which is operated to change the relative position of the rings.

A spring ball stop member 31 is arranged in the casing to engage notches 32 in the rod to hold the rings in either adjusted positions.

It will be seen on reference to Figure 2 of the drawings that the ring 25 is in engagement with the plunger 19 holding same in the inward position engaging the clutch spring 17 and the plunger 20 is free of the clutch spring 18.

By operating the rod 30 the rings 25 and 26 are moved into position to cause the operation of either one of the spring clutches and as these clutches are arranged in opposed relation, one will grip and hold the pinion from rotation in one direction while the other will slide and grip said pinion from rotation in the other.

The operation of the mechanism is thus readily reversible.

The driven shaft 33 has secured thereto a flanged disc 34 to which is secured an internal gear ring 35 which is engaged by the shoes 6 mounted on the arms 4 which are arranged in opposing direction to the arms 3.

Each of the shoes 6 is provided with gear pinions similar to the pinions 10 arranged in the shoes 5 which mesh with the gear teeth of the gear 35 and these pinions are provided with double clutch springs similar to the springs 17 and 18, but such springs are a friction engaging fit in both the pinions and shoes and drive or release in accordance with the direction of rotation of the pinions.

In the operation of this device the rotation of the crank pin 1 about the axis of the driven member and the shoes 5 on the arms 3 progressively grip the gear ring 7 through the medium of the pinion and gear teeth and the over-running spring clutches in said pinions. When these shoes grip the stationary gear ring the sleeve 2 carried by the crank pin is rotated on the pin and the rotative action on the pin is imparted to the arms 4—pivotally connected thereto and their movement is transmitted through the automatic over-running clutches therein and the teeth of the pinions carried thereby to the internal gear ring 35 which is connected with the driven shaft.

Each set of arms operates through a certain distance to rotate the driven shaft and the movement is picked up by the succeeding arms as the crank pin 1 rotates about its axis.

The ratio of rotation between the driving and driven member is varied in accordance with the eccentricity of the crank pin 1 from the crank shaft, the variation of which is not herein described as it forms no part of the present invention, but is more fully described in our co-pending application 351,727 filed April 1, 1929.

The particular element of the present invention resides in the use of gear members connected with the casing and driven shaft and engaged by pinions carried by the rotatable shoes, said pinions being alternately locked and freed by the use of an over-running clutch.

It will be readily understood by those skilled in the art that the device herein shown may be operated in a 1 to 1 ratio or direct drive by directly operatively connecting the driving member with the driven member and by effecting the disconnection of the fixed gear ring from the casing all internal moving parts will be inoperative.

What we claim as our invention is:—

1. In a variable speed transmission of the type wherein a plurality of arms mounted upon an eccentric portion of the driving member are adapted to engage a fixed member and the driven member to effect the transmission of power in variable ratios, the combination therewith of, a toothed gear mounted on the driven member, a stationary toothed gear, toothed pinions mounted on said arms and meshing with the aforesaid gears, and over-running clutches for progressively locking said pinions to said arms against rotation in one direction relative thereto.

2. In a variable speed transmission of the type wherein a plurality of arms mounted upon an eccentric portion of the driving member are adapted to engage a fixed member and the driven member to effect the transmission of power in variable ratios, the combination of a toothed gear mounted on the driven member, a stationary toothed gear, toothed pinions mounted on said arms and meshing with the aforesaid gears, and over-running clutches associated with said toothed pinions and arms and effecting a progressive locking of said pinions with said arms to prevent their rotation relative thereto selectively in either one direction or the other in accordance with the desired direction of rotation of said driven member.

3. In a variable speed transmission of the type wherein a plurality of arms mounted upon an eccentric portion of the driving member are adapted to engage a fixed member and the driven member to effect the transmission of power in variable ratios, the combination therewith of, a toothed gear mounted on the driven member, a stationary toothed gear, toothed pinions mounted on said arms and meshing with the aforesaid gears, paired clutch means associated with each of said pinions whereby the latter may be locked to said arms selectively against relative rotation in either direction in accordance with the particular clutch selected of the pair, and means for controlling the selection of said clutches whereby the direction of rotation of said driven member is determined.

4. A device as claimed in claim 1 in which said over-running clutches comprise helical spring clutching means arranged between the pinions and their carrying arms.

5. A device as claimed in claim 1 in which shoes are provided which are each pivotally connected intermediate of their length to their respective arm, and the pinions are arranged in pairs in said shoes, one at each end of the shoe, the shoes engaging the fixed or driven members to maintain the gears of each shoe in mesh with their respective toothed gear.

6. A device as claimed in claim 1 in which the pinions are formed with cylindrical recesses opening from each end thereof and said arms are formed with cylindrical recesses registering with the recesses of said pinions, said over-running clutches comprising helical spring members arranged within the pinions and arm recesses to form over-running clutch connections therebetween.

7. In a variable speed transmission of the type wherein a plurality of arms mounted upon an eccentric portion of the driving member are adapted to engage a fixed member and the driven member to effect the transmission of power in variable ratios, the combination therewith of, a rigid casing, a gear ring rigidly secured to said casing, shoes pivotally mounted on a group of said arms slidably engaging said gear ring on either side thereof, pins extending through said shoes, gear pinions rotatably mounted on said pins and each having a cylindrical recess opening from each end thereof, said shoes having cylindrical recesses of a diameter corresponding to and registering with the recesses in said pinions, helical spring clutch members arranged within the recesses in said pinions and extending into recesses in said shoes, a gear ring rigidly connected with the driven member, shoes mounted on a second group of said arms slidably engaging the driven gear ring, gear pinions mounted in said shoes meshing with the driven gear ring, and over-running clutches operatively connecting the latter shoes with the latter pinions.

8. In a variable speed transmission of the type wherein a plurality of arms mounted upon an eccentric portion of the driving member are adapted to engage a fixed member and the driven member to effect the transmission of power in variable ratios, the combination therewith of, a fixed gear ring, shoes connected with a group of said arms and associated with said gear ring, pinions mounted in the shoes and meshing with the gear ring, helical spring clutches associated with each end of said pinions and with said shoes, means for manually controlling the operation of the helical spring clutches on either end of said pinions, a gear ring secured to the driven member, shoes mounted on a second group of said arms and associated with said latter gear ring, gear pinions mounted in the latter shoes meshing with the driven gear ring, and helical spring over-running clutches operatively arranged between the latter pinions and their shoes.

9. In a variable speed transmission of the type wherein a plurality of arms mounted upon an eccentric portion of the driving member are adapted to engage a fixed member and the driven member to effect the transmission of power in variable ratios, the combination therewith of, a fixed gear ring, shoes connected with a group of said arms and associated with said gear ring, pinions mounted in the shoes and meshing with the gear ring, helical spring clutches associated with each end of said pinions and with said shoes, a pair of rings rigidly connected together and arranged one at either side of said stationary gear ring and having bevelled surfaces, studs slidably mounted in said shoes and operatively engaging the bevelled surfaces of said rings and adapted to be moved thereby to extend into the cylindrical recesses in the shoes to engage and effect the expansion of said spring clutches, manual means for operating said rings to control said studs, a gear ring rotatable with the driven member, shoes mounted on a second group of said arms co-operatively engaging said rotatable gear ring, gear pinions mounted in said latter shoes and meshing with said rotatable gear ring, and helical spring clutches arranged in said latter pinions adapted to lock said pinions with said shoes to prevent rotation thereof in a selected direction.

10. A device as claimed in claim 1 in which operable means co-operating with said over-running clutches controls their operation to effect the operative connection or disconnection of the driving and fixed members.

11. A device as claimed in claim 1 in which said over-running clutches are of the helical spring type and are co-operatively arranged between the pinions and their carrying arms, operable means being provided co-operating with the helical spring element of said clutches to control their co-operation with said pinions and carrying arms to effect the operative connection or disconnection of the driving and driven members.

HERALD B. GREENING.
JAMES W. GALLOWAY.